United States Patent

[11] 3,564,978

| [72] | Inventor | John L. Flitz |
| | | Saginaw, Mich. |
| [21] | Appl. No. | 780,654 |
| [22] | Filed | Dec. 3, 1968 |
| [45] | Patented | Feb. 23, 1971 |
| [73] | Assignee | General Motors Corporation |
| | | Detroit, Mich. |

[54] PISTON AND CONNECTING ROD
2 Claims, 3 Drawing Figs.

[52] U.S. Cl. ................................................. 92/187, 287/20
[51] Int. Cl. ..................................................... F16j 1/14
[50] Field of Search ........................................... 92/128, 187, 222, 216, 219, 255; 308/(RB); 287/20 (P), 100; 123/193 (P); 29/(Inquired), 156.5, 156.54;

[56] References Cited
UNITED STATES PATENTS

| 791,236 | 5/1905 | Anderson | 92/191X |
| 1,537,562 | 5/1925 | Stock | 287/100X |
| 2,860,614 | 11/1958 | Burnand | 92/187X |
| 3,136,306 | 6/1964 | Kamm | 92/222X |
| 3,402,643 | 9/1968 | Maat | 92/222X |

FOREIGN PATENTS

| 375,308 | 5/1907 | France | 287/20P |

*Primary Examiner*—Martin P. Schwadron
*Assistant Examiner*—Irwin C. Cohen, Jr.
*Attorneys*—J. L. Carpenter, W. F. Wagner and Robert J. Outland

ABSTRACT: A preferred embodiment provides a connecting rod integrally formed in a tee shape with the crossbar portion acting as a piston pin and having journals machined on its ends. The leg portion of the rod is made narrow adjacent the piston pin portion so that it may pass through the slotted boss of an aluminum piston to permit assembly of the piston and connecting rod. The piston pin journal associated with the slotted boss is made larger than the other to provide for ease of assembly as well as to offset the reduction in bearing area caused by the slotting of the boss.

PATENTED FEB 23 1971

3,564,978

INVENTOR.
John L. Flitz
BY
Robert J. Outland
ATTORNEY 3,564,978

PISTON AND CONNECTING ROD

FIELD OF THE INVENTION

This invention relates to reciprocating piston machines and, more particularly, to improved and simplified piston and connecting rod arrangements therefor.

DESCRIPTION OF THE PRIOR ART

Many arrangements are known in the prior art relating to reciprocating piston machines which provide for the pivotal connection of the pistons with their respective connecting rods. Possibly the most common arrangement is to provide a separate piston pin which extends through an opening or eye in the end of the connecting rod and is received in the bearing openings of bosses provided in the piston skirt or adjacent thereto. Sometimes the piston pin floats in both members and sometimes it is secured in one of the members and oscillates in the other. Bushings are sometimes provided in the piston or in the connecting rod eye to act as bearings between these parts and the piston pin.

Other prior art constructions are known in which the piston pin is formed integrally with the connecting rod. In all such known arrangements, however, the piston is provided with removable bearing caps or other means to permit the assembly of the connecting rod with the piston and to retain the parts together after assembly.

SUMMARY OF THE INVENTION

The present invention provides piston and connecting rod constructions which are simplified over those previously known for use in reciprocating piston machines. According to the invention, the piston pin may be formed as an integral part of the connecting rod and is assembled into a piston formed as a unitary casting by sliding the leg portion of the rod through a slot provided in one of the pin bosses of the piston. To permit this means of assembly, the leg of the connecting rod is made narrow adjacent the piston pin portion in a direction transverse thereto so that the slot in the piston pin boss need not be so large as to seriously reduce the effective bearing area provided. Preferably, the boss opening and piston pin journal associated with the slotted boss are made larger than those associated with the other boss to minimize the reduction of bearing area caused by the slot as well as to provide for easier assembly of the connecting rod into the piston.

These and other advantages of the invention will be more apparent from the following description of a preferred embodiment taken together with the accompanying drawing.

DESCRIPTION OF THE PREFERRED EMBODIMENT

Figure 1:
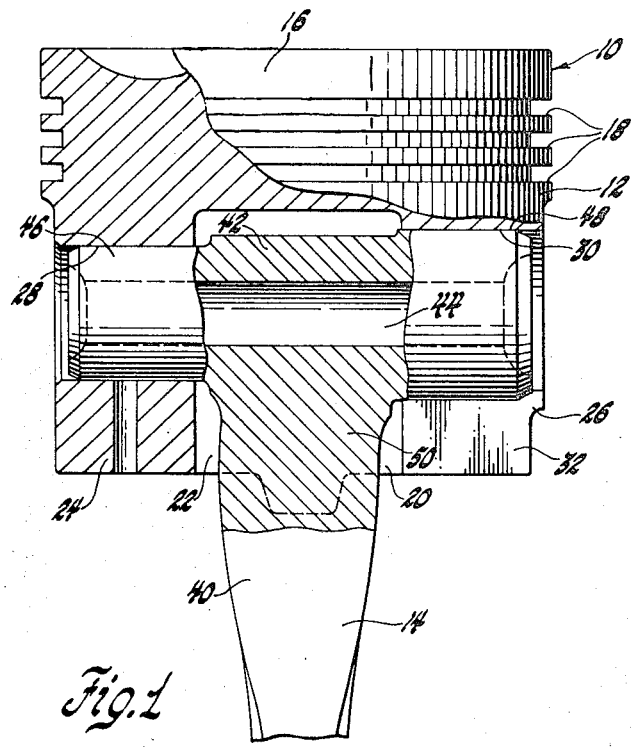
FIG. 1 is a side view of a piston and connecting rod assembly formed according to the invention with portions of the piston and connecting rod broken away to show their internal construction.
Figure 2:
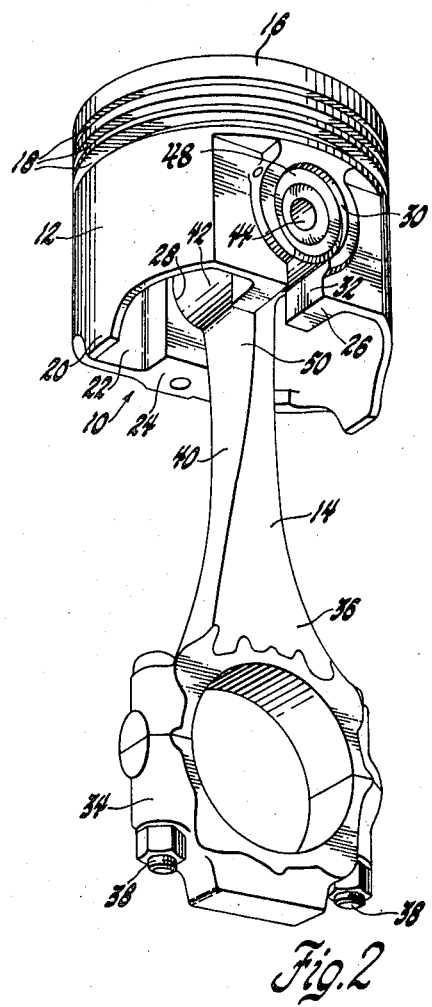
FIG. 2 is a pictorial view of the piston and connecting rod assembly of FIG. 1
Figure 3:
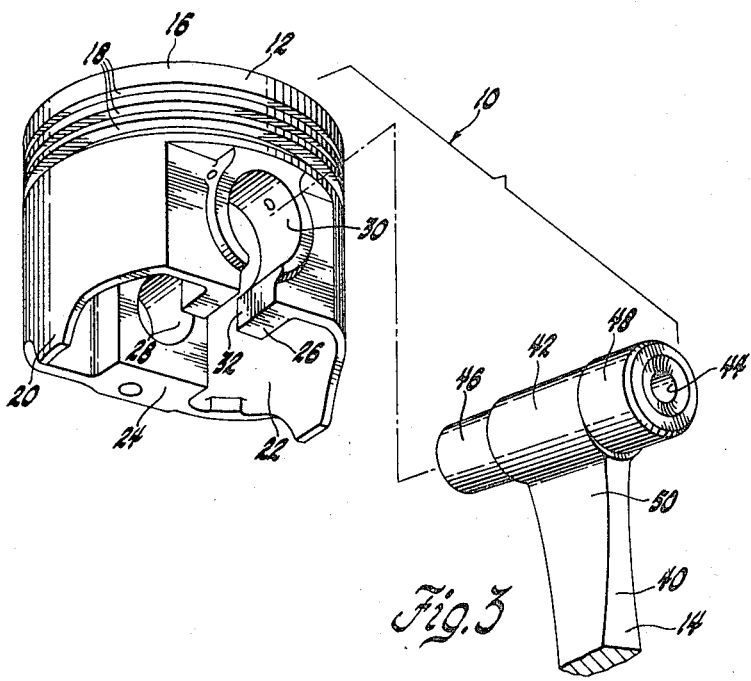
FIG. 3 is a pictorial view showing the piston and the connecting rod of FIGS. 1 and 2 in their disassembled condition and indicating the manner of assembly.

Referring to the drawing, numeral 10 generally indicates a piston and connecting rod assembly consisting of a piston 12 and a connecting rod 14.

Piston 12 is preferably formed as a unitary aluminum casting and includes a closed end 16 having annular ring grooves 18 around its periphery and connecting with a depending skirt 20 so as to define an open ended cavity 22. Formed integral with the skirt 20 are a pair of oppositely disposed bearing bosses 24, 26 which include coaxially aligned bearing openings 28, 30 respectively. A slot 32 is provided in boss 26 extending between opening 30 and the bottom of the bearing boss, extending in a direction axially of the bearing openings 28, 30. Opening 30 is larger in diameter than opening 28 and is substantially larger than the width of the slot 32 for reasons which will be subsequently described. While the slot 32 is shown as extending vertically in alignment with the axis of the piston, it would also be possible, if desired, to form the slot on an angle with the piston axis.

Connecting rod 14 is conventionally formed at its lower end to incorporate a removable cap 34 which is secured to the main upper portion 36 of the connecting rod by bolt means 38.

The upper end 36 of the connecting rod is preferably made of cast iron or steel and is formed in a tee shape having a leg portion 40 connecting with an integral crossbar or piston pin portion 42. The piston pin portion is generally cylindrical in shape and includes a drilled central opening 44 extending the length thereof to lighten the upper end of the connecting rod. The ends of the piston pin portion are machined to form journals 46 and 48 which are adapted to be received in openings 28 and 30 respectively of the piston 12.

The leg portion 40 of the rod is relatively wide in a direction axially of the piston pin portion 42 but is made narrow in a portion 50 adjacent the crossbar in a direction transverse thereto so as to permit the portion 50 of the leg to pass through the slot 32 during assembly of the connecting rod into the piston.

After assembly, journals 46, 48 are pivotably received in bearing openings 28, 30 respectively, journal 48 preferably being made larger in diameter than journal 46 so as to fit properly in the larger opening 30. This larger diameter provides a larger bearing area to offset that removed by the slot 32 in the bearing boss. In addition, the differing diameters make it easy for the smaller journal 46 to pass through the larger opening 30 during the assembly operation. Preferably the thickness of the narrow leg portion 50 should not be more than about half the diameter of the larger journal 48 so that the slot 32 may be made sufficiently small as to not reduce excessively the bearing area of the boss opening 30.

If the connecting rod is made of iron or steel and the piston of aluminum, as disclosed herein, no special bushings are required between the piston and the rod journals. If desired, however, such bushings could be provided to be installed either before or after assembly of the rod and piston. If installed after assembly, slotting of the bushing to permit passage of the connecting rod leg would be unnecessary although the piston itself would require the slot.

Another possible variation, which may be desirable to equalize thermal and mechanical deflections of the piston would be to provide slots in both piston bearing bosses even though only one is needed for assembly purposes.

While the invention has been described by reference to a single embodiment, it should be apparent that many variations of the inventive concepts disclosed are possible and the scope of the invention should be so evaluated.

I claim:

1. For use in a reciprocating piston machine, a piston and connecting rod assembly comprising:

a unitary piston having a closed end, a depending skirt connected with said closed end and defining therewith an open ended cavity, a pair of opposed bearing bosses formed integral with said skirt and including a pair of transversely aligned bearing openings, and a slot in one of said bosses extending between the bearing opening of said one boss and the open end of said skirt, said slot having a width substantially less than the diameter of the bearing opening with which it connects; and a connecting rod having one end integrally formed in a tee shape and including a crossbar portion and a leg portion, the crossbar portion of the tee shaped rod comprising a piston pin portion having journals at its outer ends received in the bearing openings and in direct engagement with the bearing bosses of said piston, the leg portion of the tee shaped rod adjacent the piston pin portion being substantially narrower in a direction transverse thereto than the diameter of the largest of said journals and narrower than said slot so as to permit the rod to pass through the slot in the piston bearing boss during assembly and disassembly of the piston and connecting rod by relative movement along the axis of the piston bearing openings, the bearing opening of said slotted boss being of larger diameter than the other bearing opening and the connecting rod crossbar journal received in said larger bearing opening being of correspondingly larger diameter than the other crossbar journal to provide for ease of assembly of the connecting rod and piston and to somewhat offset the loss of bearing surface in the slotted boss due to said slot.

2. The combination of claim 1 wherein said piston is made of aluminum and said connecting rod is made of an iron material.